May 22, 1923.

C. E. GODLEY

LAMP BRACKET

Filed Aug. 18, 1922

1,455,784

Inventor
Charles E. Godley
By Edward N. Pagelsen
Attorney

Patented May 22, 1923.

1,455,784

UNITED STATES PATENT OFFICE.

CHARLES E. GODLEY, OF DETROIT, MICHIGAN, ASSIGNOR TO EDMUNDS & JONES CORPORATION, OF DETROIT, MICHIGAN, A CORPORATION OF NEW YORK.

LAMP BRACKET.

Application filed August 18, 1922. Serial No. 582,717.

*To all whom it may concern:*

Be it known that I, CHARLES E. GODLEY, a citizen of the United States, and residing at Detroit, in the county of Wayne and State of Michigan, have invented a new and Improved Lamp Bracket, of which the following is a specification.

This invention relates to means for adjustably supporting the cup-shaped casings of headlights of motor vehicles, and which are especially adapted to be attached to the fenders of such vehicles and its object is to provide a bracket of this character which will be of great strength and which can be produced at low cost.

Figure 1:
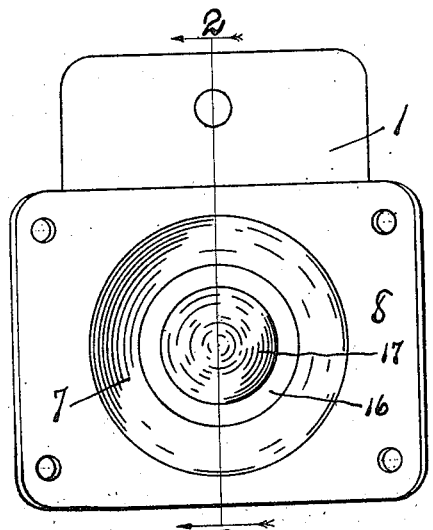
Figure 2:
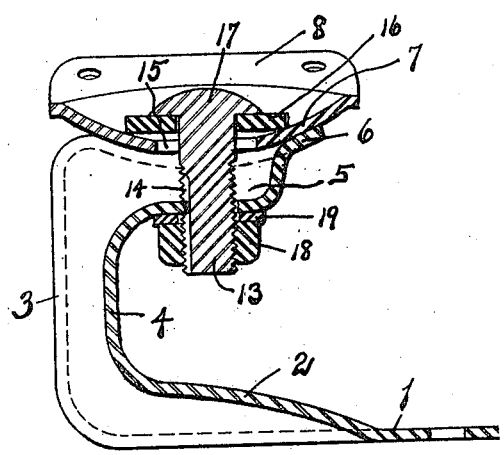
Figure 3:
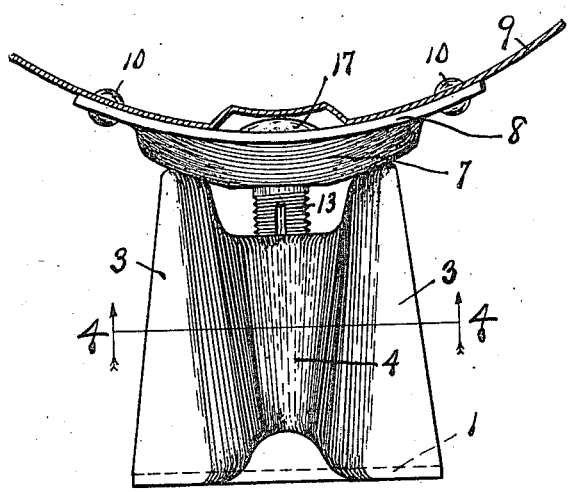
Figure 4:
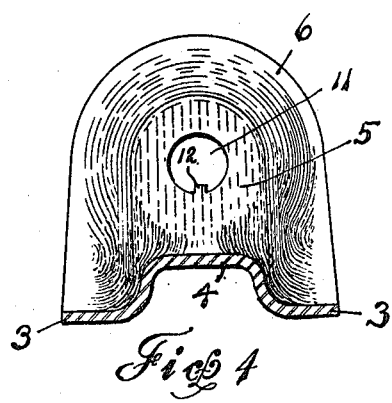

In the accompanying drawing, Fig. 1 is a plan of this improved bracket. Fig. 2 is a section on the line 2—2 of Fig. 1. Fig. 3 is an elevation thereof taken from the left in Fig. 2. Fig. 4 is a section on the line 4—4 of Fig. 3.

Similar reference characters refer to like parts throughout the several views.

This support may be made of either stampings or castings and comprises a bracket adapted to be secured to the fender, a cupped plate adapted to be secured to a lamp casing, and a bolt, nut and washer to secure the plate to the bracket. The bracket is generally U-shaped in form embodying a head, a base and a middle portion. The base consists of a flange 1 and a central rib 2, and the middle portion consists of the flanges 3 forming a continuation of the flange 1 of the base and of a central rib 4 forming a continuation of the rib 2, this rib being continued at 5 to constitute a portion of the head, the remainder of the head being in the form of a flange 6 which is a continuation of the flanges 3 and is substantially spherical to serve as a seat for the spherical central portion 7 of the plate 8 which is so shaped at the edges as to fit the lamp casing 9 to which this plate may be attached by means of the rivets 10.

The rib portion 5 of the head of this bracket has a hole 11 into which a small tongue 12 extends. A bolt 13 is slidable in this hole and is held therein at right angles to the base and the bolt has a groove 14 to receive this tongue which prevents the bolt from turning in the bracket. The aperture 15 in the plate 8 is much larger than the bolt 13 so that the plate is shiftable in every direction relative to the bracket and as the central portion 7 of this plate is spherical, the lamp casing 9 may be moved with it to swing the axis of the lamp in any desired direction. A washer 16 between the bolt head 17 and the spherical portion 7 of the plate 8 forces this plate against the flange 6 of the head when the nut 18 is screwed down. A lock washer 19 may be employed if desired.

The details and proportions of this support may all be changed by those skilled in in the art without departing from the spirit of my invention as set forth in the following claim:

I claim:

The combination of a lamp provided with a convex spherical surface and a hole in said surface, a bracket comprising a foot, an intermediate portion and a head formed with an arcuate concave seat for the spherical surface of the lamp body and with a hole adapted to aline with the hole in the lamp body, said bracket being formed of metal of substantially even thickness and with an integral rib extending along the inner sides of the foot, head and intermediate portion, a part of the groove produced by the bending of the metal to produce said rib forming a recess within the arcuate seat on the head, and a bolt extending through said holes to adjustably hold the lamp body in the bracket.

CHARLES E. GODLEY.